United States Patent [19]

Roos et al.

[11] 4,447,086
[45] May 8, 1984

[54] WIND DEFLECTOR FOR SLIDING ROOFS

[75] Inventors: Rudolf Roos, Maintal; Dieter Federmann, Rodgau, both of Fed. Rep. of Germany

[73] Assignee: Rockwell International Corporation, Pittsburgh, Pa.

[21] Appl. No.: 415,006

[22] Filed: Sep. 7, 1982

Related U.S. Application Data

[63] Continuation of Ser. No. 234,290, Feb. 17, 1981, abandoned, which is a continuation of Ser. No. 65,311, Aug. 9, 1979.

[30] Foreign Application Priority Data

Aug. 30, 1978 [DE] Fed. Rep. of Germany ....... 7825737

[51] Int. Cl.³ .............................................. B60J 7/22
[52] U.S. Cl. ................................................. 296/217
[58] Field of Search ................... 296/217; 267/41, 158

[56] References Cited

U.S. PATENT DOCUMENTS

| 3,602,205 | 8/1971 | Turkish | 267/158 |
| 3,711,150 | 1/1973 | Perks | 296/217 |
| 3,904,239 | 9/1975 | Jardin | 296/217 |
| 3,922,032 | 11/1975 | Schaller | 296/217 |
| 4,067,604 | 1/1978 | Mori | 296/217 |
| 4,081,194 | 3/1978 | Jardin | 296/217 |

Primary Examiner—Robert R. Song

[57] ABSTRACT

A wind deflector for sliding roofs, especially for use on automobiles, comprises a wind deflector plate (3) mounted pivotally on the forward roof frame crossmember. Two extend arms (4, 5) are pivotally attached at the two outer ends of the wind deflector plate. These arms are pivotally journaled on the roof frame longitudinal members. Also included is a device (11) which acts on the wind deflector plate for the pivoting path length compensation and rod-shaped extend springs (13) which are provided on each extend arm and are effective between the extend arms and the roof frame longitudinal member adjacent to each extend arm for the purpose of pivoting out the extend arms and wind deflector plate when the sliding cover is opened and for pivoting in the extend arms and the wind deflector plate by running the sliding cover onto the extend arms when the sliding cover is closed. The extend springs (13) are of circular cross section, prestressed and slidably bear from below with their free end (24) into the extend arms (4, 5). The other ends of the extend springs are fixed to bearing block (17) which are fixed to the frame longitudinal members (6, 7) for the extend arms (4, 5).

1 Claim, 6 Drawing Figures

U.S. Patent  May 8, 1984  Sheet 1 of 2  4,447,086
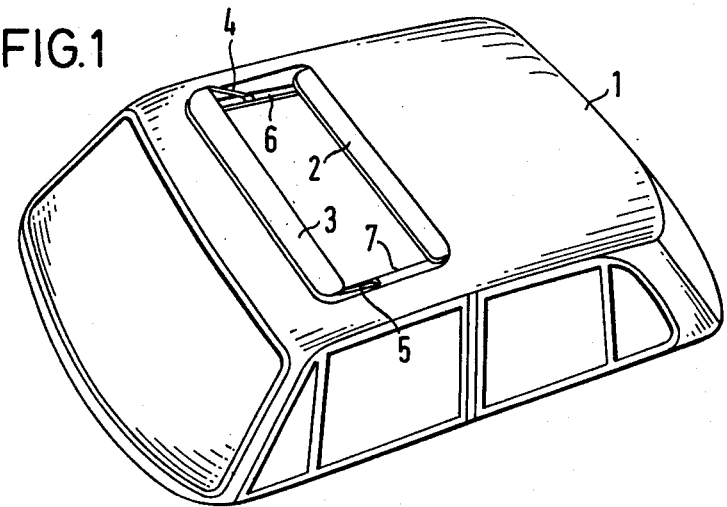
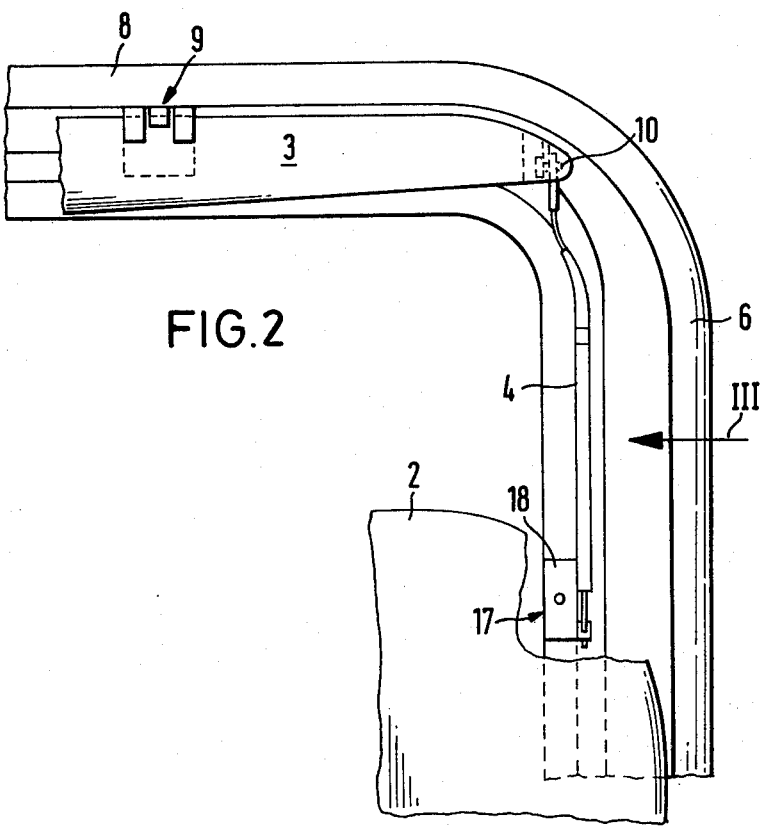

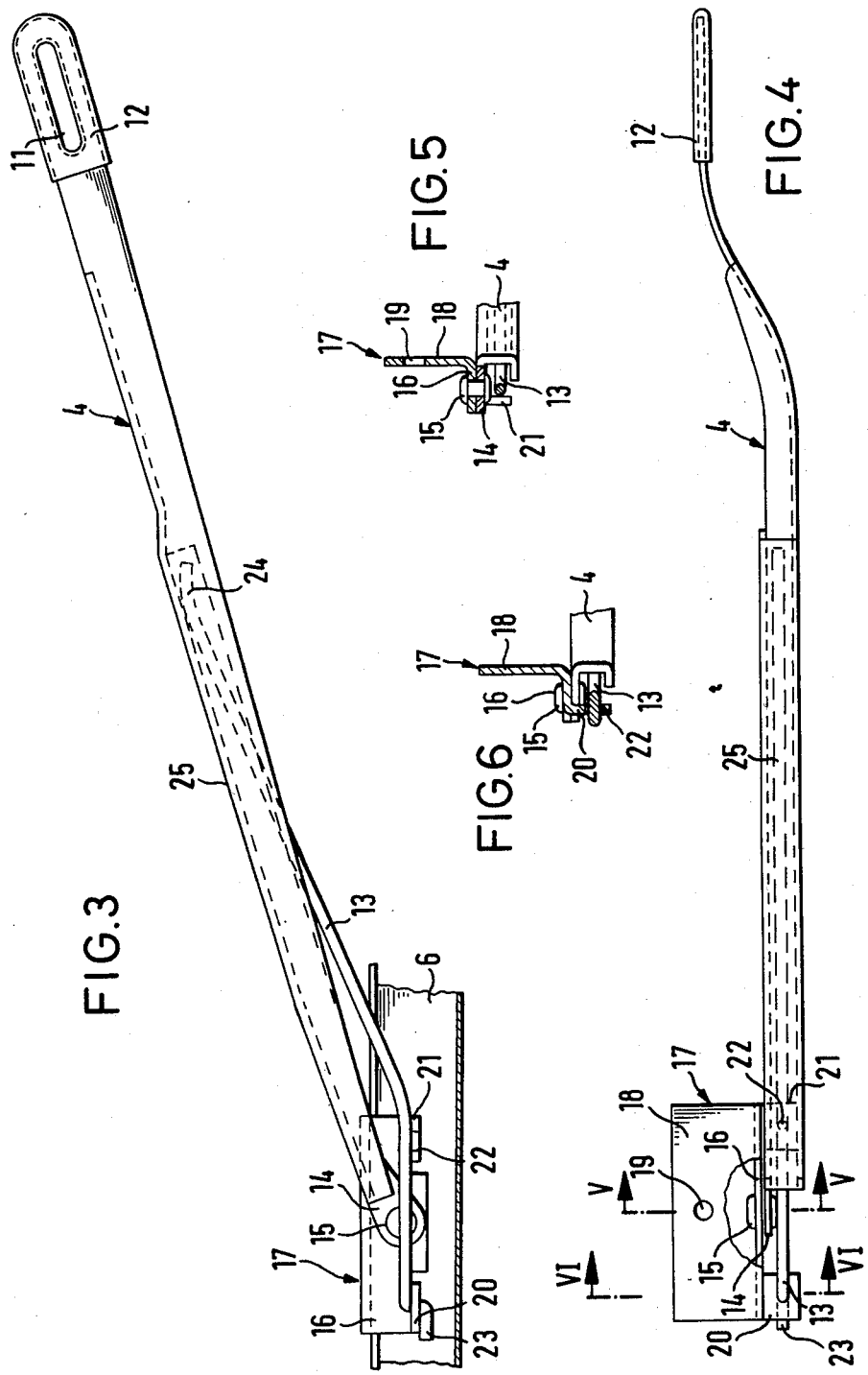

WIND DEFLECTOR FOR SLIDING ROOFS

This application is a continuation of application Ser. No. 234,290, filed Feb. 17, 1981, abandoned, which is a continuation of application Ser. No. 65,311, filed Aug. 9, 1979.

This invention relates to a wind deflector for sliding roofs, especially on automobiles, comprising a wind deflector plate pivotally mounted on the forward roof frame cross-member, two extend arms pivotally attached to the two outer ends of the wind deflector plate, which arms are pivotally journalled on the roof frame longitudinal members, devices acting on the wind deflector plate for the pivoting path length compensation, and rod-shaped extend springs provided on each extend arm and acting between the extend arms and the roof frame longitudinal member adjacent to each extend arm for the purpose of pivoting out the extend arms and the wind deflector plate when the sliding cover is opened and for pivoting in the extend arms and the wind deflector plate by running the sliding cover onto the extend arms when the sliding cover is closed.

Wind deflectors of the category described above are to some extent automatically extended or pivoted in by the adjusting movement of the sliding cover. When the sliding roof is closed, the wind deflectors are situated in the forward region between the sliding cover and the roof frame cross-member. For the functioning of the wind deflector, the construction and fitting of the extend springs is of especial importance. In one known wind deflector construction of the category initially mentioned (DE-OS No. 26 44 848) leaf springs are attached by rivetting to the extend arms in the vicinity of their bearing ends acting on the wind deflector plate, which springs bear slidably with their free ends on the frame bases of the roof frame longitudinal members. When the sliding cover is closed, the spring stress and therefore also the support pressure of the spring ends on the frame base increases. Relative sliding takes place here between the frame base and the spring end bearing on it, with the result that damage to the corrosion preventive coating of the frame can occur.

The task underlying the present invention is to avoid spring support positions which are liable to corrosion between movable and fixed parts and moreover to simplify the construction and mounting of the extend springs with a view to reducing cost.

Starting from the category initially mentioned, this task is achieved according to the present invention in that extend springs of circular cross-section are provided, which bear slidably with prestress from below with their free ends against the extend arms, and the opposite ends of which are fixed on bearing blocks for the extend arms secured to the frame longitudinal member.

In the design and construction according to the present invention, no relative displacement with its accompanying corrosion-causing effects takes place in the region of the frame longitudinal members between extend springs and roof frame longitudinal members, because the unavoidable relative movement occurs on the extend arms themselves, in regions which are remote from the water-conducting parts of the sliding roof frame. Added to this is the fact that, as a result of the spring support from below, the risk of water contact with the mutually contacting regions of the extend springs and extend arms is considerably reduced. In the wind deflector design according to the present invention the extend springs are no longer attached to the extend arms, but can be secured simply and possibly without the use of tools to the bearing blocks for the extend arms.

It is of advantage in this connection if the extend springs, for the purpose of attachment to the bearing blocks, are bent at their outer ends each to a Z-shape and are so inserted into a bore of a first bearing block projection, that the outer Z-extension of the extend springs bears from below against the first projection, whereby the extend spring bears from above against a second bearing block projection which is disposed at a distance from the first bearing block projection. In this manner fixing of the extend springs without tools is brought about, which springs when being fitted only need to be pushed with their Z-shaped end through the bore of the first bearing block projection and then to be pivoted to bring them to bear against the second bearing block projection. There is no risk of lateral slipping of the extend springs away from the second bearing block projection, because the free end of the extend spring is placed from below in the extend arm, which in known manner has a U-shaped cross-section, and is held there by the two downwardly oriented flanges of the U-section.

The two bearing block projections may favourably be disposed symmetrically with respect to the pivot bearing position for the extend arm situated on the bearing block and may each be furnished with a bore for the passage of the extend spring. This measure provides assurance that the bearing block is suitable both for right-hand and for left-hand use, the two bearing block projections only needing to transpose their positions. As a result, in addition to the fixing of the extend springs without the use of tools, a further economy in manufacture results.

Further features of this invention are explained in more detail below with reference to the drawings, which illustrate an example of embodiment thereof. The drawings show:

FIG. 1 a perspective view of an automobile roof equipped with a sliding roof and wind deflector, FIG. 2 a cut-away plan on the right, forward corner of the sliding roof frame with wind deflector, showing the cut-away forward, right corner of the sliding cover, FIG. 3 a lateral view of an extended extend arms, viewed in the direction of arrow III in FIG. 2, FIG. 4 a plan on the extend arm of FIG. 3, FIG. 5 a section along the line V—V of FIG. 4 and FIG. 6 a section along the line VI—VI of FIG. 4.

FIG. 1 shows diagrammatically the fixed vehicle roof 1, sliding cover 2, wind deflector plate 3, extend arms 4 and 5 and the two roof frame longitudinal members 6 and 7.

As can be seen from FIG. 2, the wind deflector plate 3 is pivotally attached to the forward roof frame cross-member 8 by hinge assemblies 9, only one of which is shown for simplicity. The extend arm 4 acts on the outer end of the wind deflector plate 3 in an articulated manner through a bearing pin 10 fixed to the wind deflector plate 3. In the present example of embodiment, an elongated hole 11 (FIG. 3) formed at the free end of the extend arm 4 provides the necessary pivot path length compensation. In order to reduce bearing friction and to prevent corrosion at the thrust joint 10, 11, the free end of the extend arm 4, as shown at 12 (FIG. 3) is coated with a suitable plastics material.

Since the wind deflector and the elements acting on it are symmetrically disposed with respect to the longitudinal central plane of the vehicle, only the right side of the assembly is explained for the purpose of the present description. As is apparent from FIGS. 3 to 6, the extend arm 4 has essentially—that is in the region of the extend spring 13—a U-shaped cross-section. In its forward region, it is inwardly cranked. At its inner end it possesses a bearing eye 14, which is articulated on a bearing journal 15. The bearing journal 15 is situated on a perpendicularly, downwardly oriented flange 16 of the bearing block referenced generally 17. The bearing block 17 is attached by an upper mounting plate 18 to the roof frame longitudinal member 6 or a component connected thereto of the sliding cover drive or of the sliding cover mounting. The bore 19 in the mounting plate 18 serves for this purpose.

The extend spring 13, bent from spring steel wire, is fixed to the bearing block 17 as follows. On the flange 16 of the bearing block 17, two bearing block projections 20 and 21, spaced apart, are integrally formed by bending out at right angles. To achieve a mirror-image arrangement for right-hand and left-hand use of the bearing block 17, both the projections 20 and 21 are furnished with a through bore 22 for the extend spring. The diameter of the bores 22 is approximately equal to that of the spring steel wire of the extend spring 13. The end of the extend spring 13 nearest to the bearing block is bent to a Z-shape and bears from below with the outer Z-extension 23 against the projection 20. The extend spring 13 bears simultaneously from above against the other projection 21, serving as an abutment. As can be seen, the extend spring 13 can be fixed on the bearing block by simply introducing its Z-shaped end into the associated bore 22 of the bearing block projection.

The free end 24 of the extend spring 13 is formed to a curved shape and bears from below against the extend arm 4, that is it touches the inner surface of the web of the U-section. The extend spring 13 is guided over a considerable region of its length between the lateral flanges of the U-member, so that it cannot slide off laterally from the bearing block projection 21.

For pivoting in the outwardly pivoted extend arm 4, the forward edge of the sliding cover 2 or a component connected to the sliding cover runs onto the upper surface 25 of the extend arm, causing the latter to be pivoted downwards against the force of the extend spring 13 and the wind deflector plate 3 to be simultaneously pivoted downwards via the thrust joint 10, 11. When the sliding cover is being opened, the reverse sequence of movement takes place.

We claim:

1. A wind deflector for sliding roofs, especially on automobiles, comprising a wind deflector plate mounted pivotally on the forward roof frame cross-member, two extend arms pivotally attached at the two outer ends of the wind deflector plate, which arms are pivotally journalled on the roof frame longitudinal members, devices acting on the wind deflector plate of the pivoting path length compensation and rod-shaped extend springs provided on each extend arm and effective between the extend arms and the roof frame longitudinal member adjacent to each extend arm for the purpose of pivoting out the extend arms and the wind deflctor plate when the sliding cover is opened and for pivoting in the extend arms and the wind deflector plate by running the sliding cover on to the extend arms when the sliding cover is closed, characterized in that extend springs of circular cross-section are provided, which bear with their free ends slidably with prestress from below against the extend arms, and the other ends of which are fixed to bearing blocks, fixed to the frame longitudinal member, for the extend arms, the extend springs for the purpose of fixing them to the bearing blocks are each bent at their outer ends to a Z-shaped curve and are so inserted into a bore of a first bearing block projection that the outer Z-extension bears from below against the first projection, whereby the extend spring bears from above against a second bearing block projection, which is disposed at a distance from the first bearing block projection, said two bearing block projections are symmetrically disposed with respect to the pivot bearing position for the extend arm situated on the bearing block and are each furnished with a bore for the passage of the extend spring.

* * * * *